United States Patent [19]

Shapiro et al.

[11] Patent Number: 5,625,271

[45] Date of Patent: Apr. 29, 1997

[54] BATTERY CHARGER ADAPTER AND METHOD THEREFOR

[75] Inventors: Steven C. Shapiro, Lake Worth; Eugene R. Fay, Delray Beach; Charles R. McMurray, Boynton Beach, all of Fla.

[73] Assignee: Motorola, Inc., Schaumburg, Ill.

[21] Appl. No.: 546,476

[22] Filed: Oct. 20, 1995

[51] Int. Cl.$^6$ .......................... H02J 7/00; H01M 10/46; H01M 2/10
[52] U.S. Cl. .................................. 320/2; 429/97
[58] Field of Search .............................. 320/2; 429/96, 429/97, 98, 99, 100

[56] References Cited

U.S. PATENT DOCUMENTS

D. 305,427  1/1990  Soren et al. .
D. 305,717  1/1990  Soren et al. .
5,162,719  11/1992  Tomura et al. ........................... 320/2
5,525,888  6/1996  Toya ...................................... 320/2

Primary Examiner—Peter S. Wong
Assistant Examiner—Patrick B. Law
Attorney, Agent, or Firm—Keith A. Chanroo

[57] ABSTRACT

A battery charger adapter (100) has a housing receptacle (102) formed as a battery for a cellular telephone. The housing receptacle (102) has a recessed portion (104) formed in a base surface (106) of the housing receptacle (102) for receiving a battery pack (200) to be charged, at least one holding clip (108, 110) for securing the battery pack (200) in the recessed portion (104), an electrical coupler (112) for coupling the battery pack (200) to the housing receptacle (102) and an access port (114), coupled to the electrical coupler (112), for electrically coupling the housing receptacle (102) to a charger for enabling the battery pack (200) to be charged in the battery charger adapter (100).

6 Claims, 2 Drawing Sheets

BATTERY CHARGER ADAPTER AND METHOD THEREFOR

FIELD OF THE INVENTION

This invention relates in general to battery charger adapters, and more particularly to a battery charger adapter for coupling to and charging a cellular telephone battery.

BACKGROUND OF THE INVENTION

The advent of cellular telephone heralds a new phase of two-way portable communication. However, while cellular telephone provides portable two-way communication, it brings a high economic cost for the convenience of being accessible in most geographic locations. To reduce the cost of communication, a cellular telephone is combined with a selective call receiver (pager). The combination cellular telephone and the selective call receiver have separate receiving circuits so both devices may operate, i.e., receive messages independent of each other or even simultaneously. Unfortunately, conventional cellular telephone has a limited power supply and under normal operating conditions is unable to provide a "talk-time" long enough for most users. The limited power supply of the battery is exacerbated when the cellular telephone is combined with other receiving devices because both devices place a higher demand for power on the battery which already has an inadequately short "talk-time."

Therefore, what is needed is a cost effective method and an apparatus to ensure that the battery of the combined cellular telephone and another receiving device can be recharged without missing important calls during charging.

DESCRIPTION OF A PREFERRED EMBODIMENT

Figure 1:
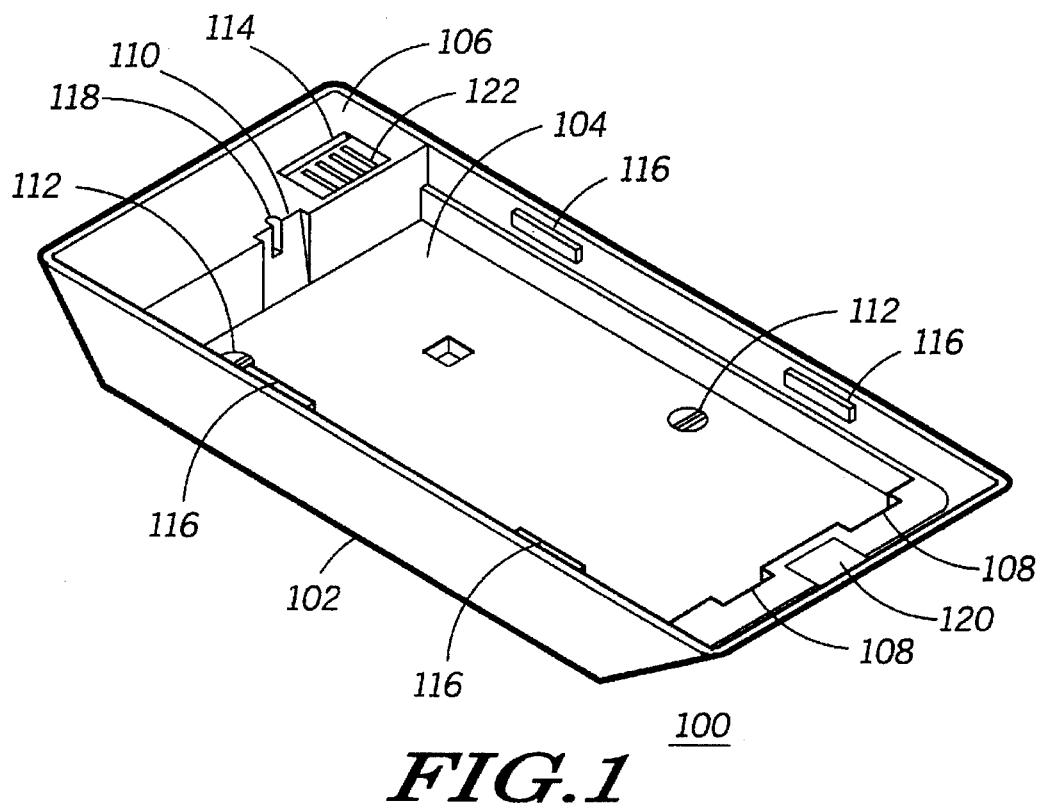
FIG. 1 is a perspective view a battery charger adapter disconnected from a battery pack in accordance with a preferred embodiment of the present invention.
Figure 2:
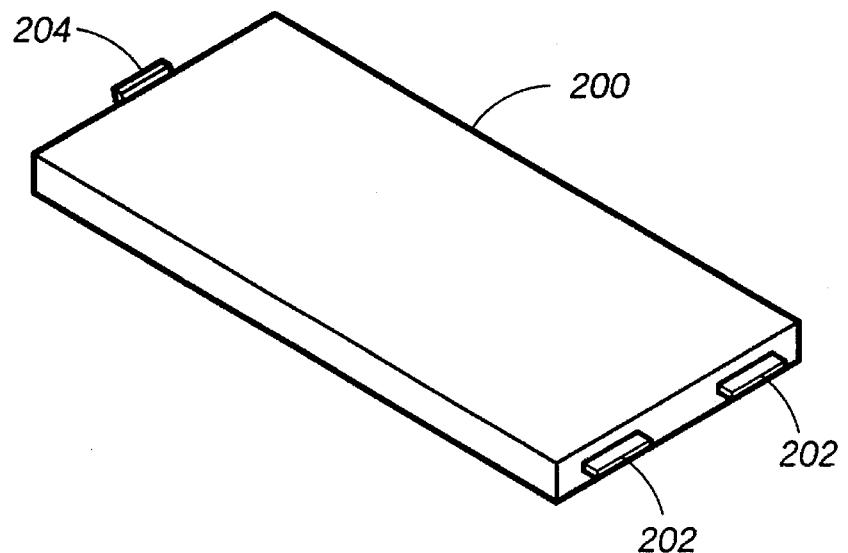
FIG. 2 is a perspective view of the battery pack to be charged in the battery charger adapter of FIG. 1.

FIG. 1 shows a perspective view of a battery charger adapter for charging a battery for a cellular telephone in accordance with a preferred embodiment of the present invention. As shown, the battery charger adapter 100 is formed as a battery for fitting and providing power to the Motorola MICROTAC[198] cellular telephone. The battery charger adapter 100 comprises a housing receptacle 102, formed as a battery for a cellular telephone, and has a recessed portion 104 formed in a base surface 106 of the housing receptacle 102 for receiving a battery pack 200 to be charged as shown in FIG. 2. The housing receptacle 102 has at least one holding clip 108, 110 for securing the battery pack 200 in the recessed portion 104. The at least one holding clip 108, 110 retains the battery pack 200 in the recessed portion 104 of the battery charger adapter 100. The at least one holding clip 108, 110, for example, comprises two grooves 108 for receiving the battery pack 200 illustrated in FIG. 2 and an opening 110, for example oppositely located from the two grooves 108 comprising a latching mechanism of any type well known to one of ordinary skill in the art for latching or locking the battery pack 200 in recessed portion 104. Referring to FIG. 2, the battery pack 200 has preferably two protrusions 202 for coupling with the two grooves 108 of the battery charger adapter 100. The battery pack 200 has a latching clip 204 coupling with a latching mechanism 118 on the battery charger adapter 100 for securing and retaining the battery pack 200 in the recessed portion 104.

Referring back to FIG. 1, an electrical coupler or coupling 112 is provided in the form of a positive and negative electrical contacts for coupling the battery pack 200 to the housing receptacle 102 which provides electrical connection for powering the cellular telephone or for charging the battery pack 200 in the battery charger adapter 100. The electrical coupling 112 via its two battery contacts make electrical contact to the battery pack 200 when the battery pack 200 is secured in the recessed portion 104 of the battery charger adapter. An access port 114 is coupled to the electrical coupling 112 and provides access to the electrical coupling 112 and electrically connects the housing receptacle 102 to a charger for enabling the battery pack 200 to be charged while in the battery charger adapter 100. The access port 114 also has other data and control signal contacts 122.

The housing receptacle 102 further comprises rails 116 for slidably coupling the battery charger adapter 100 to a cellular telephone. The access port 114 couples to the electrical coupling 112 to provide power from the battery pack 200 in the battery charger adapter 100 to power the cellular telephone. A locking clip 120 locks the battery charger adapter 100 to the cellular telephone.

Figure 3:
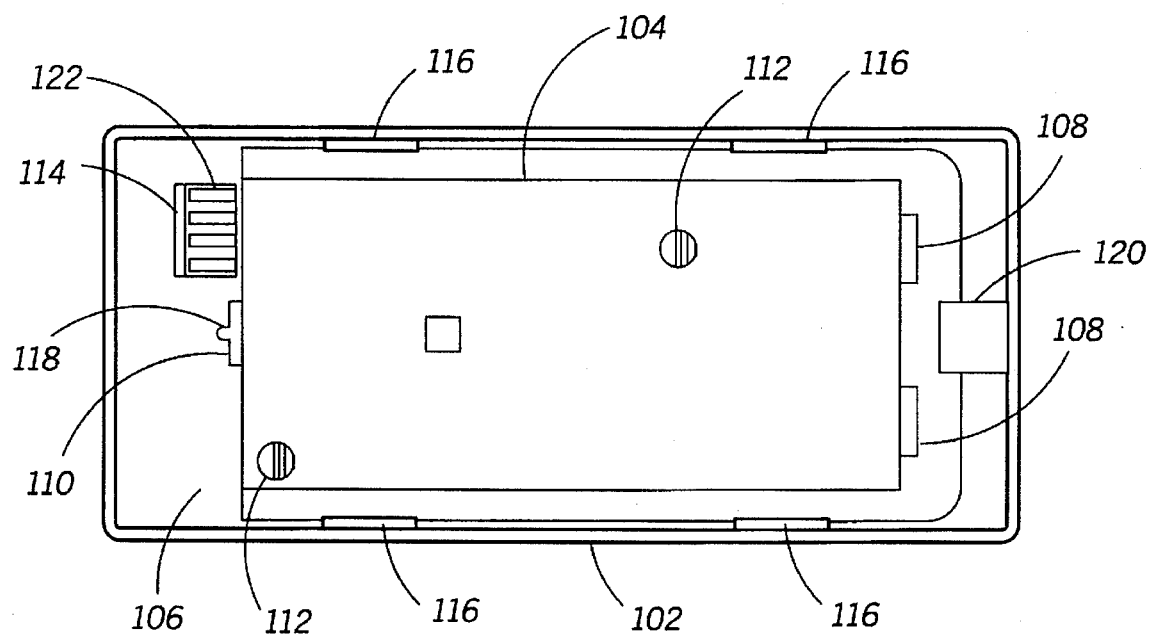
FIG. 3 is a plan view of the battery charger adapter illustrated in FIG. 1.
Figure 4:
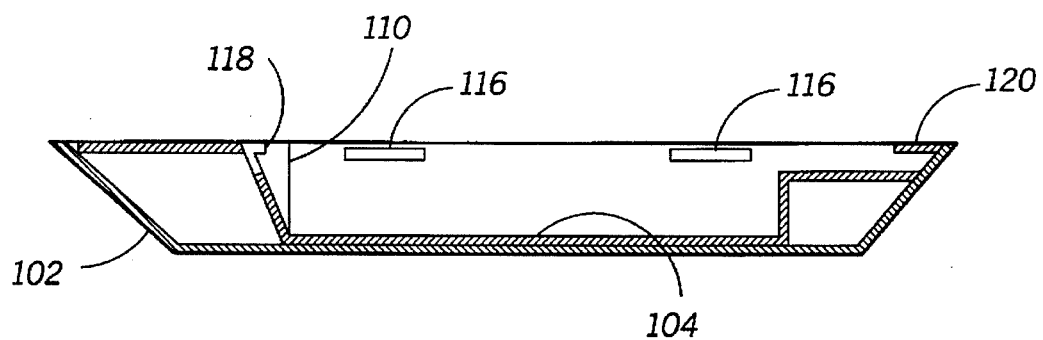
FIG. 4 is a cross sectional side view of the battery charger adapter illustrated in FIG. 1.

FIGS. 3 and 4 show a plan view and a cross sectional side elevation, respectively, of the battery charger adapter 100. The plan view of FIG. 3 shows the recessed portion 104 formed in the base surface 106, the two grooves 108, the opening 110 having the latching mechanism 118, the rails 116, the locking clip 120 and the electrical coupler 112. Similarly, FIG. 4, the cross-sectional side elevation, illustrates the recessed portion 104, the rails 116, the locking clip 120 and the opening having the latching mechanism 118 as discussed in reference to FIG. 1.

In this way, a battery pack for powering a cellular telephone and another receiver, for example a selective call receiver, can be de-coupled from the battery to enable another battery pack to be inserted in the battery to power the cellular telephone and the selective call receiver. The decoupled battery pack can be inserted in a battery charger adapter to be placed in a desktop charger for charging the battery pack. The battery charger adapter with a charged battery pack can be used to provide power to the cellular telephone because the battery pack is formed fitted for a cellular telephone and has rails for permitting the battery charger adapter to be coupled to the cellular telephone.

Therefore, the user does not need to have two fully charged batteries to keep her cellular telephone/selective call receiver powered beyond the life of a single battery because the user is able to remove the discharged battery pack and insert another battery pack to quickly provide power to her cellular telephone/selective call receiver. In the meantime, the discharged battery pack can be placed in the battery charger adapter to be charged in a desktop charger.

In summary, a battery charger adapter has a housing receptacle formed as a battery for a cellular telephone. The housing receptacle has a recessed portion formed in its base surface for receiving a battery pack to be charged and at least one holding clip secures the battery pack in the recessed portion. The at least one holding clip has at least one retaining means and an opening oppositely located to the at least one retaining means for securing the battery pack. The opening has a latching means for latching the battery pack in the recessed portion. An electrical coupler couples the battery pack to the housing receptacle with two battery contacts for making electrical contact to the battery pack when the battery pack is secured in the recessed portion. An access port couples to the electrical coupler for electrically coupling the housing receptacle to a charger for enabling the battery pack to be charged in the battery charger adapter. The housing receptacle has rails for coupling the battery charger adapter to the cellular telephone and the access port provides power from the battery pack in the battery charger adapter to the cellular telephone.

As can be seen, a specific embodiment of the present invention has been shown and described. Further modifications and improvements will occur to those skilled in the art without departing from the scope and spirit of the invention disclosed herein.

What is claimed is:

1. A battery charger adapter, comprising:
   a housing receptacle formed as a battery for a cellular telephone, said housing receptacle, comprising:
   a recessed portion formed in a base surface of the housing receptacle for receiving a battery pack to be charged;
   at least one holding clip for securing the battery pack in the recessed portion, the at least one holding clip, comprising:
   at least one retaining means; and
   an opening oppositely located to the at least one retaining means for securing the battery pack;
   an electrical coupler for coupling the battery pack to the housing receptacle; and
   an access port, coupled to the electrical coupler, for electrically coupling the housing receptacle to a charger for enabling the battery pack to be charged in the battery charger adapter.

2. The battery charger adapter according to claim 1 wherein the electrical coupler comprises two battery contacts for making electrical contact to the battery pack when the battery pack is secured in the recessed portion.

3. The battery charger adapter according to claim 1 wherein the opening further comprises a latching means for latching the battery pack in the recessed portion.

4. The battery charger adapter according to claim 1 wherein the housing receptacle further comprises:
   rails for coupling the battery charger adapter to the cellular telephone; and
   said access port for providing power from the battery pack in the battery charger adapter to the cellular telephone.

5. A battery charger adapter, comprising:
   a housing receptacle formed as a battery for a cellular telephone, said housing receptacle, comprising:
   a recessed portion formed in a base surface of the housing receptacle for receiving a battery pack to be charged;
   at least one holding clip for securing the battery pack in the recessed portion, said at least one holding clip, comprising:
   at least one retaining means; and
   an opening oppositely located to the at least one retaining
   means for securing the battery pack, the opening further comprises a latching means for latching the battery pack in the recessed portion;
   an electrical coupler for coupling the battery pack to the housing receptacle, the electrical coupler comprises two battery contacts for making electrical contact to the battery pack when the battery pack is secured in the recessed portion; and
   an access port, coupled to the electrical coupler, for electrically coupling the housing receptacle to a charger for enabling the battery pack to be charged in the battery charger adapter.

6. The battery charger adapter according to claim 5 wherein the housing receptacle further comprising:
   rails for coupling the battery charger adapter to the cellular telephone; and
   said access port for providing power from the battery pack in the battery charger adapter to the cellular telephone.

* * * * *